United States Patent [19]

Naito et al.

[11] Patent Number: 5,027,563
[45] Date of Patent: Jul. 2, 1991

[54] WORK TRANSFER DEVICE OF GRINDING MACHINE

[75] Inventors: Yasuo Naito; Hideki Kinoshita; Kanji Handa, all of Hiroshima; Keiichi Nakamura, Kure, all of Japan

[73] Assignee: Mazda Motor Corporation, Hiroshima, Japan

[21] Appl. No.: 433,208

[22] Filed: Nov. 8, 1989

[30] Foreign Application Priority Data

Nov. 9, 1988 [JP] Japan .................... 63-145394[U]

[51] Int. Cl.5 ................ B24B 5/18; B24B 5/34
[52] U.S. Cl. .................. 51/215 R; 51/215 UE; 51/235; 82/124; 82/125
[58] Field of Search ......... 51/215 R, 216 R, 215 HM, 51/215 UE, 235; 82/124, 125, 102

[56] References Cited

U.S. PATENT DOCUMENTS

| 3,849,944 | 11/1974 | Noll | 51/235 |
|---|---|---|---|
| 4,002,246 | 1/1977 | Brandt et al. | 51/235 |
| 4,458,566 | 7/1984 | Tajima | 82/124 |
| 4,753,047 | 6/1988 | Yoshikawa et al. | 51/215 HM |
| 4,794,831 | 1/1989 | Cheng | 82/124 |
| 4,872,289 | 10/1989 | Yukawa et al. | 51/215 UE |

Primary Examiner—Frederick R. Schmidt
Assistant Examiner—Blynn Shideler
Attorney, Agent, or Firm—Wenderoth, Lind & Ponack

[57] ABSTRACT

A workpiece transfer device of a grinding machine is provided with an arm having a suction pad thereon for transferring ground workpieces. Since air is injected from the suction pad when the arm is in a standby position, coolant and grinding chips are not sucked into the suction pad.

21 Claims, 16 Drawing Sheets

WORK TRANSFER DEVICE OF GRINDING MACHINE

BACKGROUND OF THE INVENTION

1. Field of the invention

This invention relates to a workpiece transfer device of a grinding machine wherein a rotationally driven main shaft and a tailstock spindle hold a workpiece therebetween, and wherein shoes are utilized to support the workpiece so as to maintain the workpiece at a grinding position.

2. Description of the Prior Art

A conventional grinding machine which utilizes shoes as well as a rotationally driven main shaft and tailstock spindle to hold a workpiece is disclosed in Japanese Patent Application Gazette No. 48-36557. This publication discloses a workpiece holding device of a grinding machine wherein a disc plate is fastened to the end surface of a main shaft to rotationally drive a workpiece, and a plurality of work-holding devices, each of which comprises a pair of shoes for rotatably holding each workpiece. The pairs of shoes are disposed along the axis of the main shaft on a foundation of the grinding machine. A holding member having a holding surface opposed to the disc plate is connected to a cylinder device provided on an arm or a table such that the holding member is axially movable. Further, in this device, the main shaft and the holding member are linked to rotate synchronously, and the plurality of workpieces are held between the disc plate and the holding member such that they are movable only in the radial direction. With this construction, the plurality of workpieces can be ground simultaneously by rotating the plurality of workpieces as they are held together by the main shaft and the holding member.

The grinding machine equipped with this type of workpiece holding device has limited space to allow for removing workpieces after they have been processed since the workpieces are supported by shoes. Due to such space limitations, it is difficult to design a mechanism for mechanically holding workpieces to remove them from the grinding machine. It is thus necessary to devise a compact mechanism which requires little space within which to function.

To solve these problems, a suction pad employing vacuum pressure can be used to remove workpieces from the grinding position. This method enables reliable removal of workpieces even in a limited space. However, this creates another problem. That is, in the process of attracting the workpieces by suction, the suction pad is likely to absorb coolant and grinding chips and become clogged.

When removing finished workpieces, it is necessary to provide space for removing the workpieces by moving the tailstock spindle back and moving the grinding wheel away from the workpieces. This operation, however, results in a longer machining time and a decreased efficiency.

SUMMARY OF THE INVENTION

An object of the present invention is to provide a workpiece transfer device for a grinding machine by which processed workpieces can be reliably removed and transferred in a limited space without lowering the machining efficiency.

To achieve the above-mentioned object, the device of this invention must have a construction wherein a rotationally driven main shaft and a tailstock spindle hold a workpiece therebetween, and wherein shoes are utilized to support the workpiece and for maintaining the workpiece at the grinding position. In addition to this construction, the device of the present invention comprises an arm which is movable between a transfer position spaced from the grinding position and a removal position for removing work from the grinding position, a suction pad fixed on the end portion of the arm such that when the arm is in the removal position, the suction pad is opposite the workpiece in the grinding position, pneumatic means connected with the suction pad for injecting air from the suction pad when the arm is in a standby stroke during which no workpiece is transferred and for sucking air into the suction pad when the arm is in a removal stroke whereby it transfers a workpiece.

Functions of each element in this device will be described. In the removal stroke, a pneumatic means is activated so that the suction pad on the end of the arm in the removal position attracts the processed work. The arm is then pivotally moved so as to transfer the workpiece. When the arm is in its standby position, the pneumatic means is also activated to inject air from the suction pad. As a result, coolant and grinding chips are not attracted into the suction pad when the arm is in the standby position. Thus, clogging of the suction pad is prevented.

In this way, reliable removal and transfer of the processed workpiece can be achieved even in a limited space without lowering the efficiency of the grinding process.

DETAILED DESCRIPTION OF THE INVENTION

A workpiece transfer device of a grinding machine of the present invention will be described in detail with reference to the accompanying drawings.

General construction of the grinding machine 12 will be discussed with reference to FIGS. 1 through 4.

Figure 1:
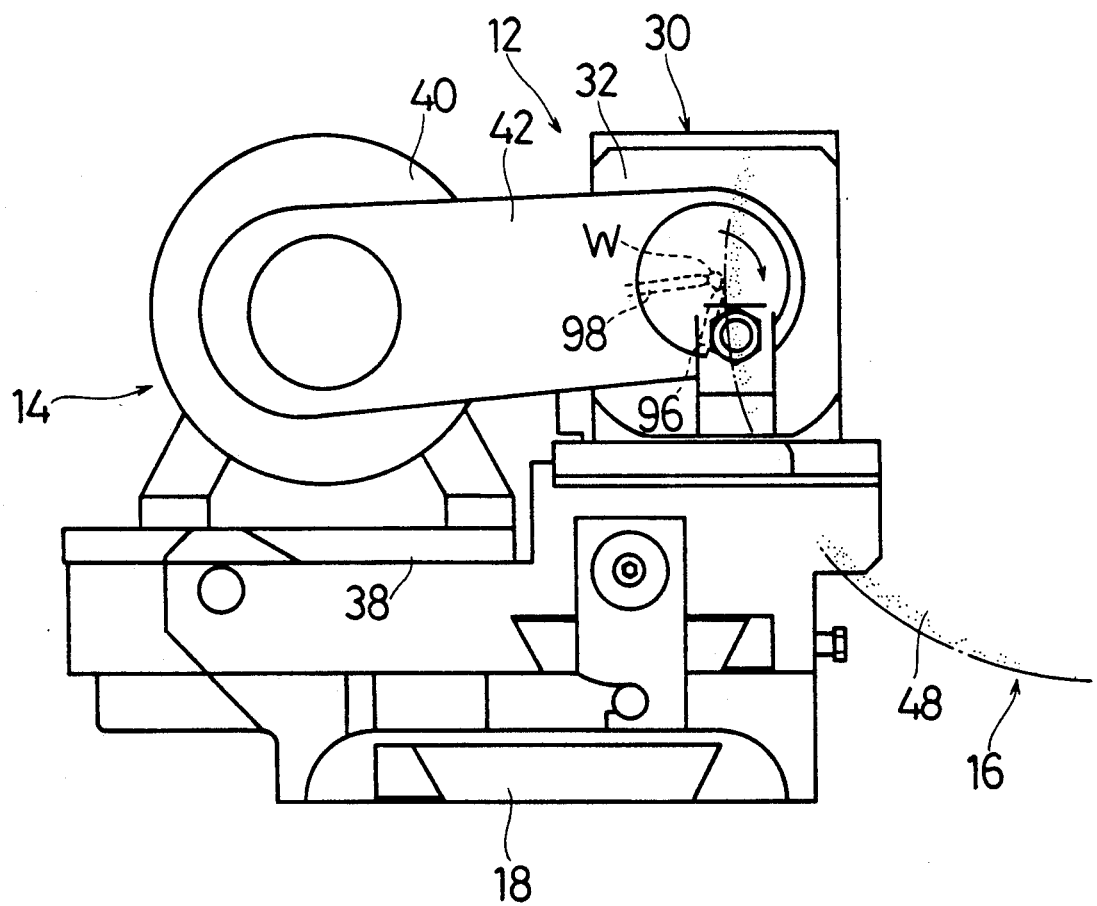
FIG. 1 is a front view of a grinding machine.
Figure 2:
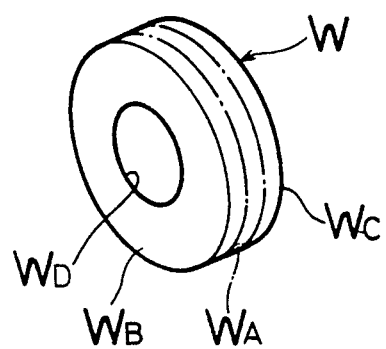
FIG. 2 is a perspective illustration of a workpiece.

The grinding machine 12, a front view of which is shown in FIG. 1, grinds a workpiece W (which is shown in FIG. 2 as being an inner race of a ball bearing). More specifically, the grinding machine 12 grinds the inner race to form a groove $W_A$ throughout the entire periphery of the inner race, which defines the workpiece W. As shown in FIG. 2, workpiece W is substantially cylindrical with both sides $W_B$ and $W_C$ being supported by a main shaft and a tailstock spindle. A hole $W_D$ is formed prior to grinding at the center of the workpiece W.

As shown in FIG. 1, the grinding machine 12 generally comprises a workpiece rotary device 14 for rotatably driving the workpiece W which is supported from both sides thereof, and a wheel device 16 for grinding workpiece W to form the groove $W_A$ about the outer periphery thereof.

Figure 3:
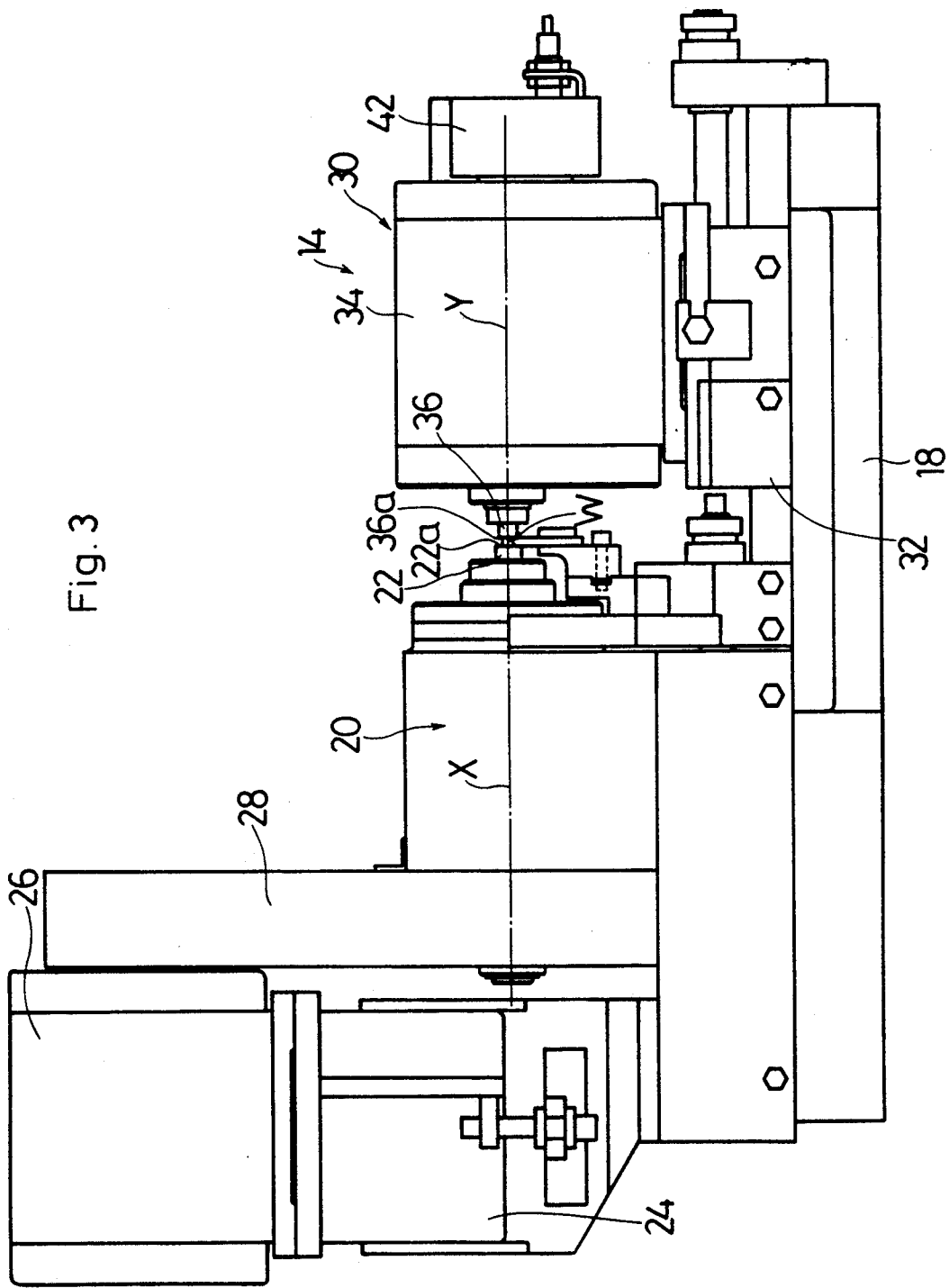
FIG. 3 is a side view of the grinding machine.

As shown in FIG. 3, the workpiece rotary device 14 comprises a base 18 placed on a foundation (not shown in the drawings), a main shaft mechanism 20 fixed on the base 18, a main shaft 22 mounted for rotation about the horizontal axis of the main shaft mechanism 20, a first driving motor 26, for rotating the main shaft 22, mounted on the base 18 by means of a mounting stand 24 such that it is positioned above the main shaft 22, a first driving force transmission mechanism 28 for transmitting the driving force of the motor 26 to the main shaft 22 by interconnecting the first driving motor 26 and the main shaft 22.

End surface 22a of the main shaft 22 acts as one of the holding surfaces which contacts the surface $W_B$ of workpiece W so as to hold the workpiece. The end surface 22a also acts as a reference surface when supporting and processing the workpiece W. The main shaft 22 is mounted in the main shaft mechanism 20 and is fixed against movement in the axial direction (longitudinal direction in FIG. 3 and FIG. 4).

Figure 4:
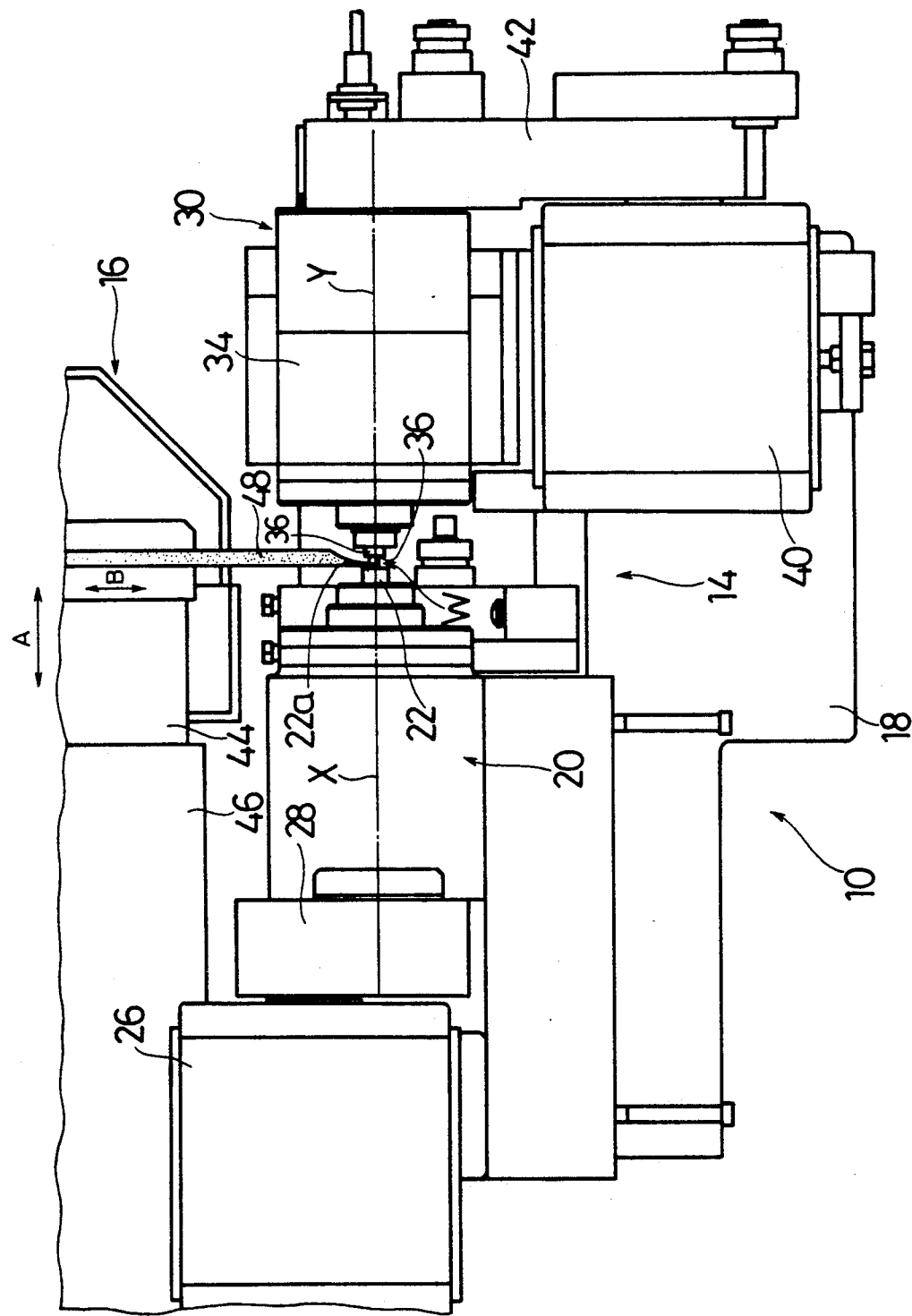
FIG. 4 is a top view of the grinding machine.

As shown in FIG. 3 and FIG. 4, the workpiece rotary device 14 is provided with a tailstock mechanism 30 which is mounted so as to be axially opposed to the main shaft mechanism 20. Tailstock mechanism 30 comprises a slider 32 for slidably mounting a tailstock spindle driving mechanism 34 for axial movement relative to the main shaft 22, the tailstock spindle driving mechanism 34 being fixed on the slider 32. The tailstock mechanism 30 also includes a tailstock spindle 36 mounted to the tailstock spindle driving mechanism 34 for rotation about the axis of rotation Y which is colinear with the axis of rotation X of the main shaft 22.

As shown in FIG. 4, the tailstock spindle mechanism 30 comprises a second driving motor 40 for driving the tailstock spindle 36. The second driving motor 40 is mounted on the slider 32 by means of a mount 38 adjacent to the tailstock spindle driving mechanism 34. The tailstock spindle mechanism 30 also includes a second driving force transmission mechanism 42 for transmitting the rotary driving force of the driving motor 40 to the tailstock spindle 36 by interconnecting the second driving motor 40 and the tailstock spindle driving mechanism 34. Both the first and second driving force transmission mechanisms 28, 42 are equipped with endless belts.

End surface 36a of the tailstock spindle 36 opposed to end surface 22a of the main shaft 22 acts as a holding surface which contacts the surface $W_C$ of the workpiece W when holding the workpiece W from both sides thereof. The end surface 36a acts as a thrusting surface for thrusting workpiece W against the main shaft 22 with a fixed force.

The tailstock spindle driving mechanism 34 transmits the rotary driving force of the second driving motor 40 to tailstock spindle 36, and presses the end surface 36a of the tailstock spindle 36 with a fixed force against end surface 22a of the main shaft 22.

The first and the second driving motors 26, 40 are rotated synchronously to rotate the main shaft 22 and the tailstock spindle 36, to thereby rotate workpiece W held between the main shaft 22 and the tailstock spindle 36.

As shown generally in FIG. 4, the wheel device 16 of the grinding machine 12 comprises a base 44 fixed on the foundation separately from the base 18 of the work rotary device 14, a wheel driving mechanism 46 mounted on the base 44, and a substantially disk-shaped wheel 48 which is adapted to be rotatably driven by the wheel driving mechanism 46.

The wheel driving mechanism 46 is slidably supported on the base 44 for movement along a first axis (as indicated by an arrow A in the drawing) which is parallel to the axis of rotation X of the main shaft 22. Furthermore, the wheel driving mechanism 46 is slidably supported for movement along a second axis (as indicated by an arrow B in the drawing) which crosses the axis of rotation X of the main shaft 22. Although not shown in the drawings, the wheel driving mechanism 46 is connected with the first and second slide mechanisms for sliding the mechanism 46 respectively along the first axis and the second axis.

The wheel 48 can be slid along the second axis indicated by arrow B, so as to selectively position it to grind more or less deeply into the outer periphery of the workpiece.

Figure 5:
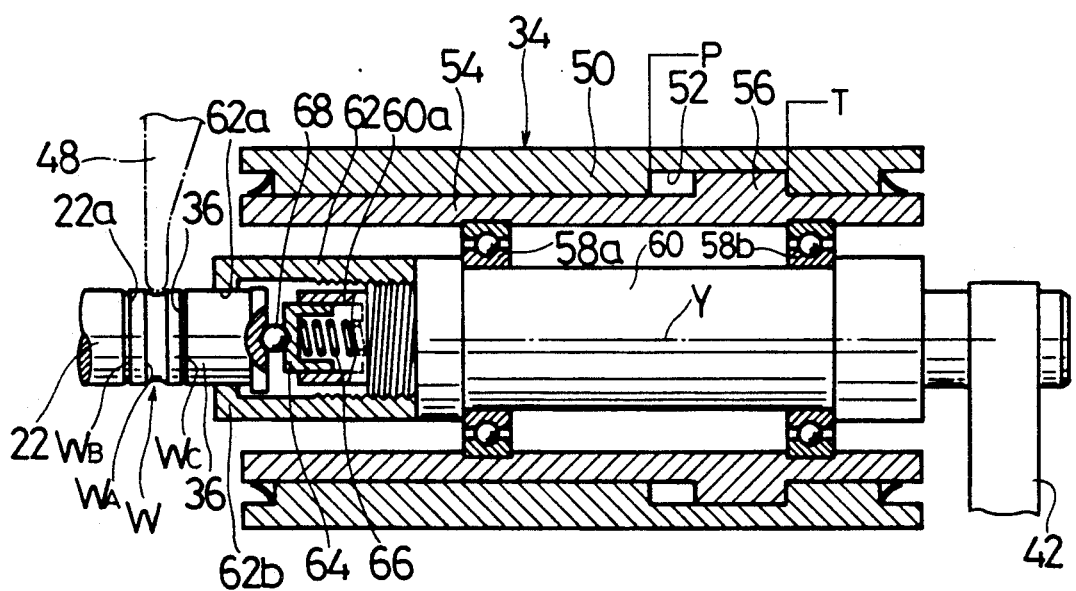
FIG. 5 is a vertical sectional view of a tailstock spindle driving mechanism of a tailstock mechanism.

Next, construction of the tailstock spindle driving mechanism 34 for rotating and sliding the tailstock spindle 36 along the axis of rotation Y will be described in detail with reference to FIG. 5.

The tailstock spindle driving mechanism 34 fixed on the base 18 is provided with an external cylinder 50 extending along the axis of rotation Y. Formed within the external cylinder 50 along the inner surface thereof is a ring-shaped cylinder chamber 52. Accommodated also inside the external cylinder 50 is an internal cylinder 54 which is slidable along the axis of rotation Y in contact with the inner circumference of the external cylinder 50. Formed along the outer periphery of the internal cylinder 54 is a piston body 56 accommodated inside the cylinder chamber 52.

The axial length of the piston body 56 is shorter than the axial length of the cylinder chamber 52. Accordingly, this difference in length enables the internal cylinder 54 to slide along the axis of rotation Y in contact with the external cylinder 50.

Although not shown in the drawings, connecting ports of a hydraulic circuit are provided on both front and rear ends of the cylinder 52. Each connecting port is connected to a hydraulic source (not shown in the drawings) by means of a switching valve (not shown in the drawings). More specifically, when the switching valve is operated to direct hydraulic pressure toward the front (i.e. toward the left in FIG. 5) connecting port, the internal cylinder 54 is forced to move backwards (toward the right in FIG. 5) until the rear end of the position body 56 abuts the external cylinder 50 as shown in FIG. 5. On the other hand, when the switching valve is operated to direct hydraulic pressure toward the rear connecting port, the internal cylinder 54 is forced to move forward until the front end of the piston body 56 abuts the external cylinder 50.

Within the slidably driven internal cylinder 54, a rotary shaft 60 is rotatably supported by means of a pair of radial bearings 58a, 58b. Wound around the rear end of the rotary shaft 60 is the endless belt of the second driving force transmission mechanism 42 for rotating the shaft 60. The endless belt and thus the shaft 60 is rotated when the second driving motor 40 is activated.

The tailstock spindle 36 is slidably supported along axis Y by a supporting cylinder 62 provided at the front end of the rotary shaft 60. The front end of the supporting cylinder 62 is closed by an end wall 62b having a hole 62a in its center. Furthermore, a cylindrical spring-accommodating portion 60a with an opening at the front side thereof is provided at the front end of the rotary shaft 60.

Pressing member 64 is accommodated slidably along axis Y at the front opening of the spring accommodating portion 60a. Provided between the rear surface of the pressing member 64 and the front surface of the rotary shaft 60 is a coil spring 66 which generates a force to push the pressing member 64 forward. Also provided between the tailstock spindle 36 slidably supported by the supporting cylinder 62 and the pressing member 64 pushed forward by coil spring 66 is a ball 68.

When moving workpiece W into the grinding position specified in the drawings, the switching valve is operated to direct hydraulic pressure toward the front connecting port to move the internal cylinder 54 backward until the rear end of the piston body 56 abuts against the external cylinder 50. This causes the tailstock spindle 36 mounted in the internal cylinder 54 to slide rearwardly to its retracted position (to the right direction in the drawing) and the workpiece W can be set in its grinding position between the end surface 22a of the main shaft 22 and the end surface 36a of the tailstock spindle 36.

After the workpiece W is set in the grinding position, the switching valve is operated to direct hydraulic pressure toward the rear connecting port to slide the internal cylinder 54 forward until the front end of the piston body 56 abuts against the external cylinder 50. This causes the tailstock spindle 36 to slide forwardly to its extended position (to the left in the drawing) to secure the workpiece W between the tailstock spindle 36 and the main shaft 22 with the force exerted by the coil spring 66.

As already mentioned, a ball 68 is placed between the tailstock spindle 36 and the rotary shaft 60. Accordingly, even a possible difference in the number of rotations between the main shaft 22 and the rotary shaft 60 should not cause any problem since sliding motion of the ball 68 enables relative rotation between the main shaft 22 and rotary shaft 60, thus maintaining reliable rotation of the workpiece W.

Since the coil spring 66 is provided between the tailstock spindle 36 and the rotary shaft 60, the force which the tailstock spindle 36 exerts against the workpiece W is not from the above mentioned hydraulic pressure, but from the force of the coil spring 66 which depends on the displacement of the coil spring 66. Since force generated by the coil spring 66 is smaller to some extent, sliding movement between the workpiece W and the tailstock spindle 36 is permitted during rotary operation of the workpiece W as will be described below.

As will be described later, force is exerted against the rotating workpiece W to press it against a pair of shoes since the position of the central axis of the workpiece W determined by the pair of shoes is slightly offset from axes of rotation X and Y. Due to this force acting on workpiece W, the central axis of the workpiece W is always offset from the axes of rotation X and Y. However, as described above, the workpiece W is held in position by coil spring 66 with a relatively small force. Accordingly, the offset of workpiece W from the central axis will be corrected by the sliding motion between the workpiece W and the tailstock spindle 36, thereby achieving stable rotation of the workpiece W about its central axis.

The grinding machine 12 of the present invention is furnished with a workpiece feed device 70 for feeding each workpiece W to the grinding position of the grinding machine 12, and a workpiece transfer device 10 for removing and transferring the finished workpiece to the next position where the work is processed further.

Description of the workpiece feed device 70 will be set forth in detail with reference to FIG. 6 and FIG. 7.

Figure 6:
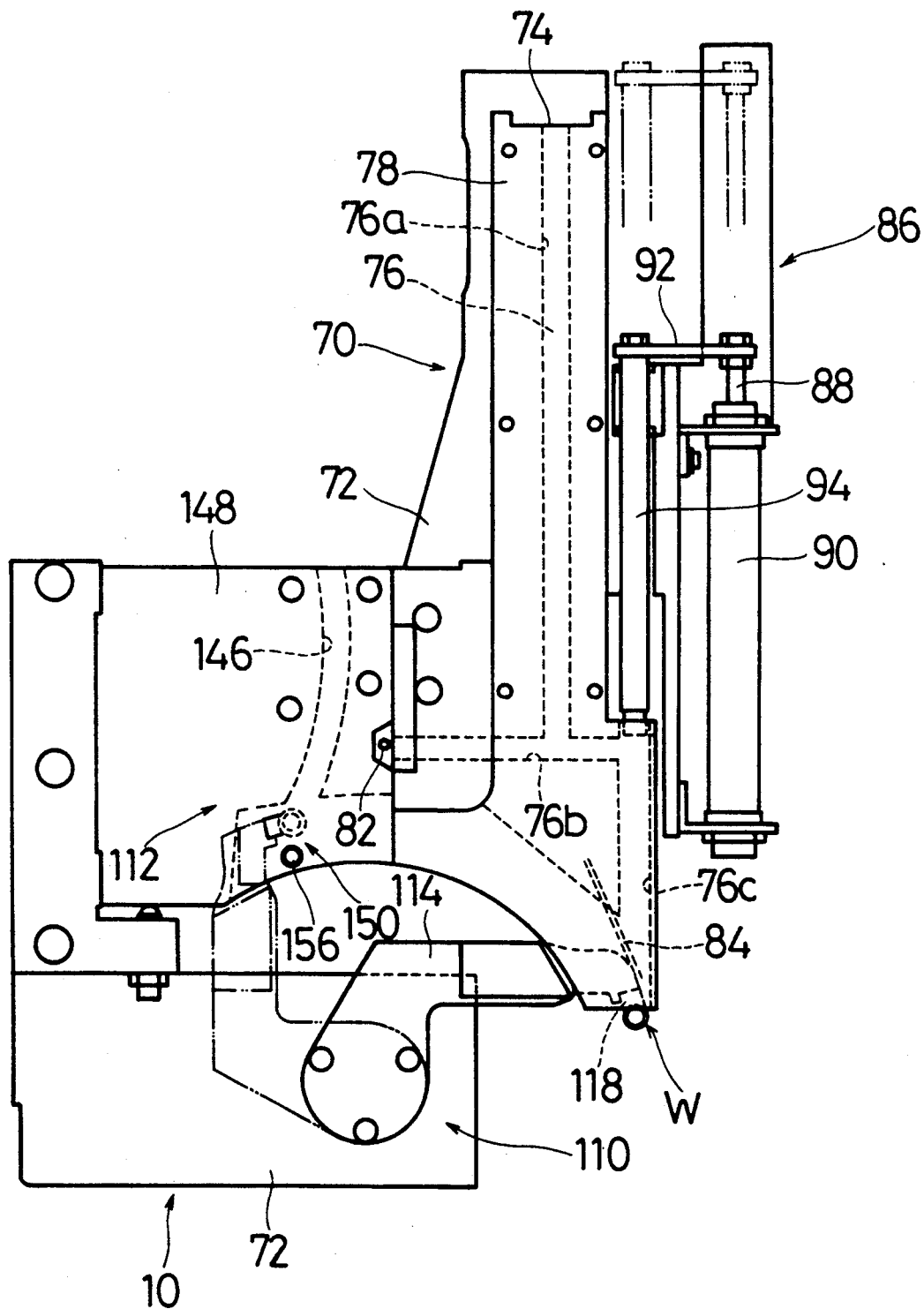
FIG. 6 is a front view of a workpiece feed device and a workpiece transfer device.

As shown in FIG. 6, the workpiece feed device 70 is equipped with a device body 72 erected on the base 18. The device body 72 and a device body of the workpiece transfer device 10, which will be described later, are held together as one unit. Here in this workpiece feed device 70, workpiece W is loaded from a workpiece inlet opening 74 formed in the upper part of the device while both sides (sides to be held) $W_B$, $W_C$ of the workpiece W are parallel to the end surface 22a of the main shaft 22 and the end surface 36a of the tailstock spindle 36. Workpiece W first drops vertically, is transferred horizontally, and then drops vertically again to be set in a position directly above the grinding position.

Provided on one side of the device body 72 is a groove-defining plate 78. As shown in FIG. 7, formed within the groove-defining plate 78 is a guide groove 76 which guides workpiece W from the workpiece inlet opening 74 to the position directly above the grinding position. The guide groove 76 comprises a first vertical groove 76a, the upper end opening of which forms the work inlet opening 74. The guide groove 76 also comprises a horizontal groove 76b, an intermediate portion of which communicates with the first vertical groove 76b at the lower end thereof, and a second vertical groove 76c, an upper end of which communicates with the horizontal groove 76b at the outer end thereof (right end portion in FIG. 7).

A transfer rod 80 is provided inside the horizontal groove 76b for slidably transferring the workpiece W, which has fallen to the lower end of the first vertical groove 76a, to the upper end of the second vertical groove 76c. At the inner end (left end in FIG. 7) of the transfer rod 80 extending from the side of the groove defining plate 78, a driving pin 82 connected to a rod driving mechanism (not shown in the drawings) is provided. Formed at the outer end (right end in FIG. 7) of the transfer rod 80 is a vertically extending hole 80a which is large enough to allow the workpiece W to pass therethrough.

Figure 7:
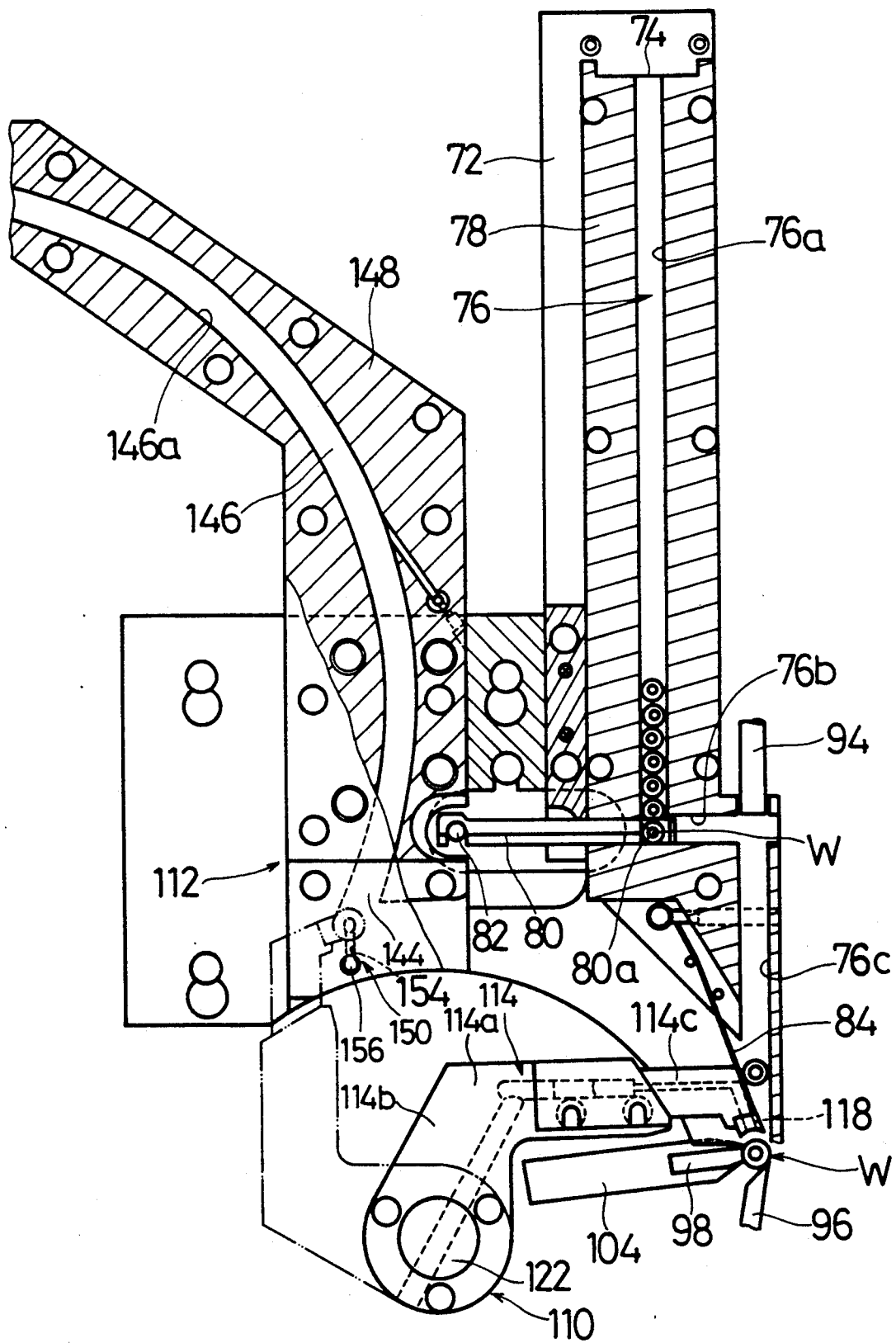
FIG. 7 is a front view of the workpiece feed device and the workpiece transfer device showing a partial section of a removal mechanism.
Figure 8A:
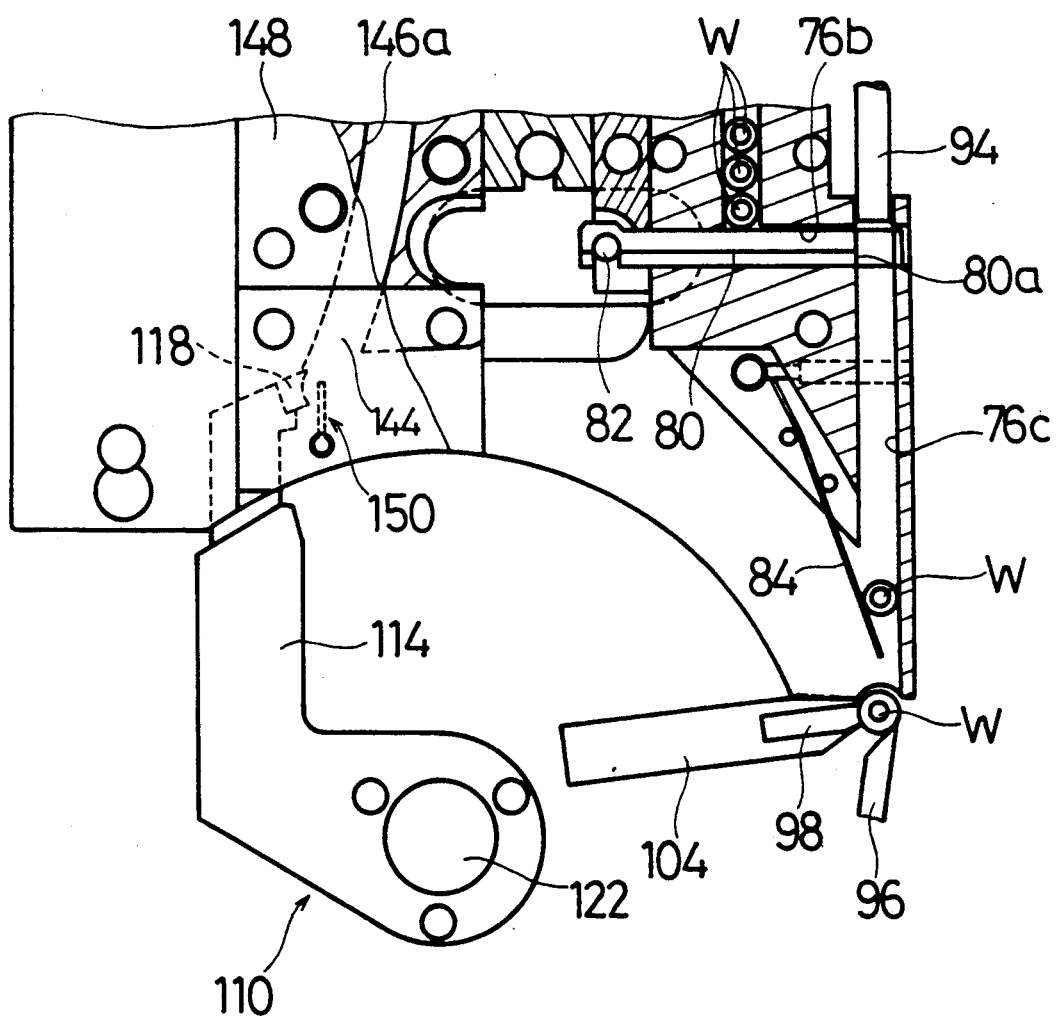
FIG. 8A is a front view of the workpiece feed device with a transfer rod in a projecting position and a push rod in an upper position.

By means of the driving pin 82, the rod driving mechanism slides the transfer rod 80 back and forth inside the horizontal groove 76b between a withdrawing position (shown in FIG. 7) and a projecting position (shown in FIG. 8A). In the withdrawing position, the transfer rod 80 is positioned such that the hole 80a formed at the outer end thereof communicates with the lower end of the first vertical groove 76a. In the projecting position, the transfer rod 80 is positioned such that the hole 80a communicates with the upper end of the second vertical groove 76c.

Since the second vertical groove 76c ends well above the grinding position, the lower end thereof is positioned almost midway between the outer end of the horizontal groove 76b and the grinding position.

Figure 8B:
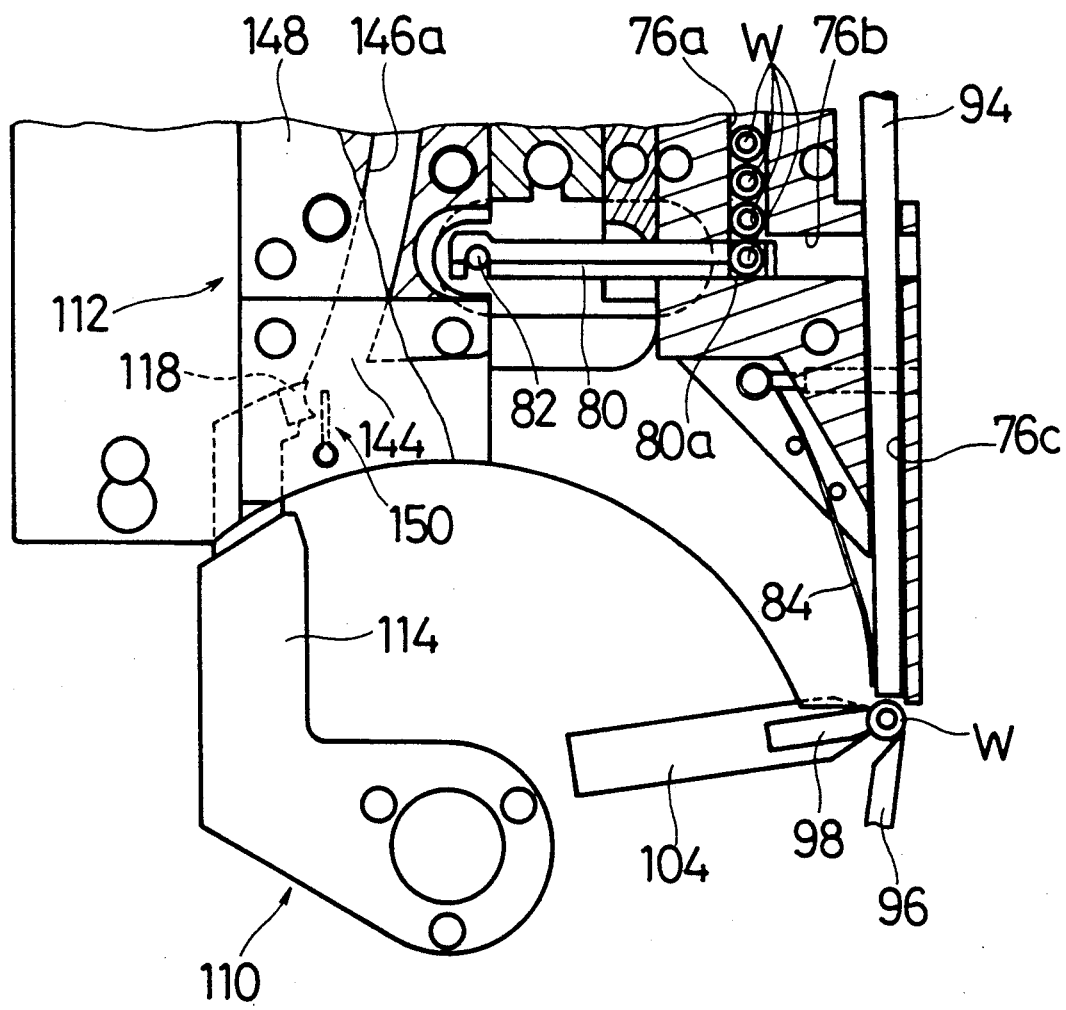
FIG. 8B is a front view of the workpiece feed device with the push rod in a lower position.

A catching leaf spring 84 is fixed to the device body 72 and has its lower end extending into the path of the workpiece W (which is defined by the lower end of the second vertical groove 76c) through to the grinding position. This catching leaf spring 84 is sufficiently elastic to catch workpiece W falling through the second vertical groove 76c in the catching position as shown in FIG. 8A. As shown in FIG. 8B, when a push rod 94 of a push mechanism 86 is moved downwardly, it exerts a force from above against the workpiece W. This force causes the catching leaf spring 84 to bend elastically to make way for the workpiece W to fall to the grinding position.

As shown in FIG. 6, the push mechanism 86 is provided to force the workpiece W to drop from the catching position to the grinding position. The push mechanism 86 comprises a hydraulic cylinder 90 which is provided in the front of the device body 72 and is equipped with a vertically reciprocating piston 88, and the push rod 94 which is mounted for vertical movement by the device body 72 and is connected via a connecting member 92 to an upper end of the piston 88.

In this push mechanism 86, when piston 88 is extended upwardly from the hydraulic cylinder 90 as indicated by phantom lines in FIG. 6, the lower end of the push rod 94 is positioned slightly above the horizontal groove 76b at the upper end of the second vertical groove 76c as shown in FIG. 7 and FIG. 8A. On the other hand, when piston 88 is retracted into the hydraulic cylinder 90 as indicated by solid line in FIG. 6, the lower end of the push rod 94 is in a position to press down the workpiece W after it has been caught by the catching leaf spring 84.

In this manner, the push rod 94 can be lowered to the lower position so as to push the workpiece W downwardly with the result that the catching leaf spring 84 is bent toward the left in FIG. 7 so as to allow the workpiece W to fall to the grinding position where it will be supported by a pair of shoes.

Figure 9:
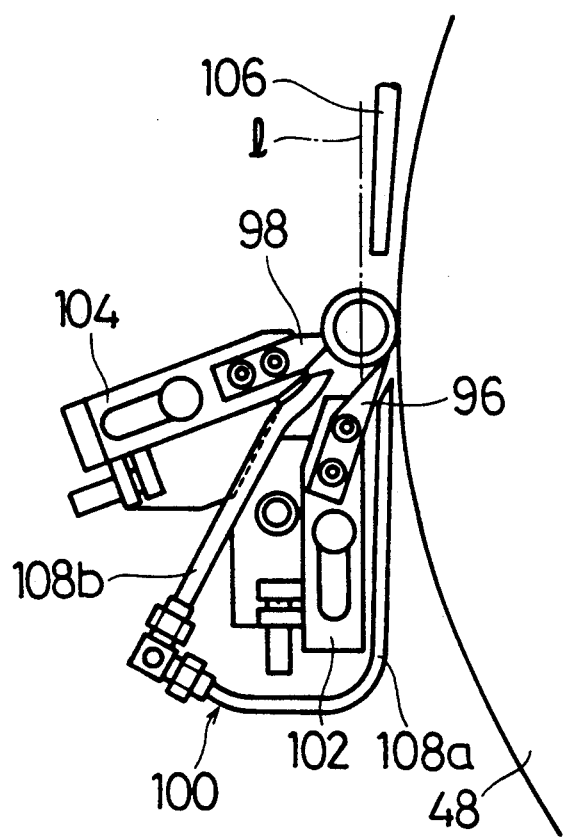
FIG. 9 is a front view of a pair of shoes and a coolant feed mechanism.
Figure 10:
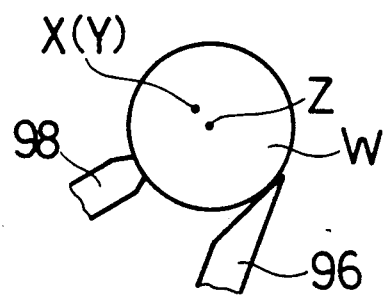
FIG. 10 is a front view illustrating how the workpiece is supported by a pair of shoes and the axis of rotation of the main shaft and the tailstock spindle are offset from one another.

Referring to FIG. 9 and FIG. 10, the above-mentioned pair of shoes for supporting the workpiece W in the grinding position will now be described. Also, a coolant feed device 100 for cooling the workpiece W as it is being processed and for improving the roundness of the finished workpiece W will be described.

The pair of shoes are composed of a front shoe 96 disposed close to the wheel 48 and a rear shoe 98 disposed away from the wheel 48, with respect to a vertical axis l which passes through the central axis of workpiece W in the grinding position. Front shoe 96 and rear shoe 98, both of which are formed of super steel, are fastened to shoe holders 102, 104. Shoe holders 102, 104 are adjustably mounted respectively to a front mounting plate of the main shaft mechanism 20 shown in FIG. 3.

Shoe holder 102 for the front shoe is so disposed that the point of contact (i.e. the supporting point) between the front shoe 96 and the workpiece W is offset toward the wheel 48 from the vertical axis l passing through the central axis of workpiece W. On the other and, the shoe holder 104 for the rear shoe is so disposed that the point of contact (i.e. the supporting point) is offset from the vertical axis l away from the wheel 48. Accordingly, as the workpiece W falls onto the pair of shoes 96, 98, it is maintained in the predetermined grinding position supported by the shoes 96, 98.

As shown in FIG. 10, the central axis (supporting center) Z of the workpiece W in the grinding position on both shoes 96, 98 should be offset by a fixed distance from the axes of rotation (center of rotation) X, Y of the main shaft 22 and the tailstock spindle 36, respectively. The axes of rotation X, Y are set off to the upper left of the supporting center Z of the workpiece W as shown in FIG. 10.

As a result, when the main shaft 22 and the tailstock spindle 36 rotate while the workpiece W is supported on both shoes 96, 98 and held between the main shaft 22 and the tailstock spindle 36, the workpiece W rotates in contact with both shoes 96, 98. At this time, as described earlier, rotationally driven workpiece W is forced toward both shoes 96, 98 since the center of axes of rotation X, Y of the main shaft 22 and the tailstock spindle 36 are offset from the axis l. In other words, the workpiece W can be maintained in contact with and pressed against both shoes 96, 98 while rotating. Thus, the workpiece W can be rotated in a stable manner.

As shown in FIG. 9, the above-mentioned coolant feed device 100 comprises three coolant feed pipes 106, 108a, 108b provided about the periphery of the workpiece W when in the grinding position, and a coolant feed mechanism (not shown in the drawings) for supplying these coolant feed pipes 106, 108a, 108b with coolant.

More specifically, provided above workpiece W in the grinding position is the vertically extending main coolant feed pipe 106 and coolant is fed from a lower end opening thereof to the point of contact between th workpiece W and the wheel 48. Coolant fed from the main coolant feed pipe 106 cools the wheel 48 and the workpiece W during the grinding process so as to prevent overheating thereof.

Provided below the workpiece W in the grinding position are the coolant feed pipes 108a and 108b. First coolant feed pipe 108a is located between the front shoe 96 and the wheel 48. Coolant is fed to the points of contact between the workpiece W and the front shoe 96, and between the workpiece W and the wheel 48 from the upper end opening of the first coolant feed pipe 108a.

Second coolant feed pipe 108b is located between the front shoe 96 and the rear shoe 98. Coolant is fed to the points of contact between the rotating workpiece W and the front shoe 96, and between the workpiece W and the rear shoe 98 from the upper end opening of the second coolant feed pipe 108b.

Due to three coolant feed pipes 106, 108a, 108b being provided in the device, workpiece W is rotated while maintained in the fixed grinding position properly in contact with both shoes 96, 98. As a result, the roundness of the finished workpiece and the finishing accuracy can be improved.

Taking the example of the first coolant feed pipe 108a, coolant fed therefrom blows off grinding chips and abrasive grains and thus prevents them from intruding into the point of contact between the front shoe and the workpiece W. Accordingly, the grinding position of the workpiece W on the front shoe 96 is precisely maintained. This will lead to increased product value because of the improved roundness and finishing accuracy of the processed workpiece W.

Furthermore, grinding chips and abrasive grains blown by coolant fed from the first coolant feed pipe 108a will be further blown in a different direction by coolant fed from the second coolant feed pipe 108b. Accordingly, chips and grains are prevented from interfering at the point of contact between the rear shoe 98 and the workpiece W.

In this way, the grinding position of the workpiece determined relative to the rear shoe 98 is also precisely maintained, thereby resulting in an improved roundness of the workpiece W.

The three coolant feed pipes 106, 108a, 108b join at their ends and are connected to the coolant feed mechanism (not shown in the drawings). The coolant feed mechanism supplies coolant only while the workpiece W is rotating while being held between the main shaft 22 and the tailstock spindle 36. In other words, even when the main shaft 22 and the tailstock spindle 36 are both rotated, once hydraulic pressure is introduced to the front hydraulic port and the tailstock spindle is retracted, the workpiece W stops rotating, and the supply of coolant is interrupted. Accordingly, even if negative pressure is supplied to a suction hole 124 of a suction pad 118 in a removal mechanism 110 (which will be discussed later) to remove finished work from the grinding position, no coolant will be sucked into the suction hole 125.

Construction of the workpiece transfer device 10 will be discussed below with reference to FIG. 6, FIG. 7, and FIGS. 11 through 13.

As generally shown in FIG. 6, the workpiece transfer device 10 comprises a removal mechanism 110 for removing workpiece W after it has been processed in the grinding position (that is, after it has been ground so as to form the groove $W_A$ in its outer periphery) mechanism 112 for transferring workpiece W removed by removal mechanism 110 to the next processing position (where, for example, internal grinding is performed to form the hole $W_D$ of the workpiece W).

First, removal mechanism 110 will be discussed. This removal mechanism 110 comprises a removal arm 114 rotatably mounted to the device body 72, a driving mechanism 116 (see FIGS. 11 and 12) mounted at the front of the device body 72 for moving the removal arm 114 between a removal position (indicated by solid line in FIG. 6) for removing the workpiece W from the grinding position and a transfer position (indicated by phantom lines in FIG. 6), for example, located 90 degrees away from the removal position, a suction pad 118 disposed at the end of the removal arm 114, and pneumatic means 120 (see FIG. 13) for selectively generating compressed air or decompressed air in the suction pad 118.

Figure 11:
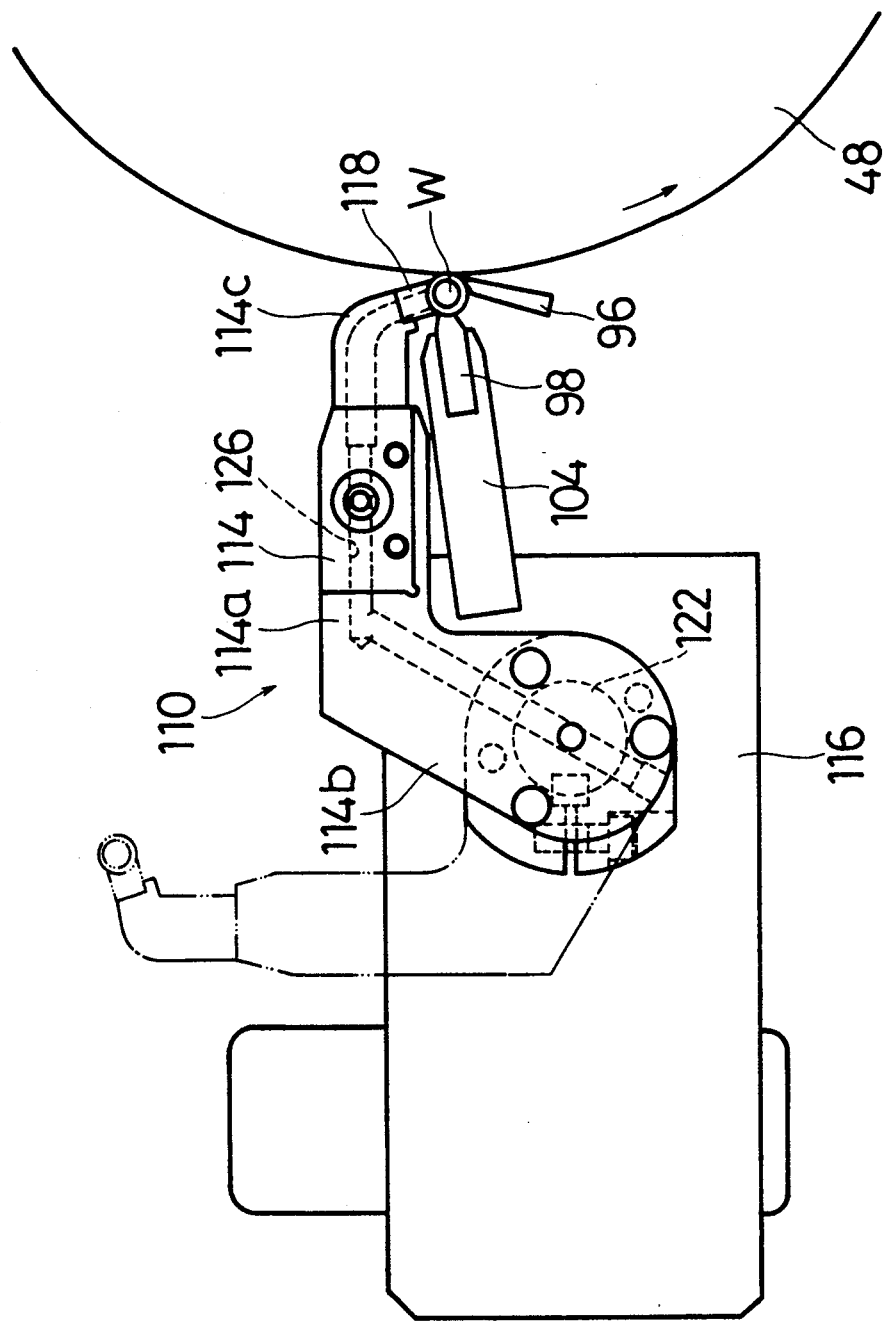
FIG. 11 is a front view showing a removal arm of the removal mechanism in the work transfer device.

As shown in FIG. 11, the removal arm 114 is, at the base end thereof, mounted at the end of driving shaft 122 of the driving mechanism 116. The suction pad 118 is provided at the end of the removal arm 114. As shown in the drawings, the removal arm 114 comprises a substantially horizontally extending intermediate portion 114a when the removal arm 114 is in the removal position, a base end 114b diagonally extending rearwardly from the rear end of the intermediate portion 114a and connected with the driving shaft 112, and an end portion 114c having an end diagonally extending forwardly from the end of the intermediate portion 114a and located directly above the workpiece W when in the grinding position.

The suction pad 118 is provided at the edge of the end portion 114c. An end surface 118a of the suction pad 118 has a curved surface with a curvature equal to the curvature of the outer periphery of the workpiece W so as to engage therewith when the workpiece W is in the grinding position (see FIG. 13). Formed at the end surface 118 of the suction pad 118 is a suction hole 124 which is connected with pneumatic means 120 by means of a communicating hole 126 extending through the removal arm 114.

The end portion 114c to which this suction pad 118 is mounted is detachably connected to the intermediate portion 114a. Therefore, a suction pad which is suitable for a workpiece W having a particular shape can be attached by changing the end portion 114c.

Figure 13:
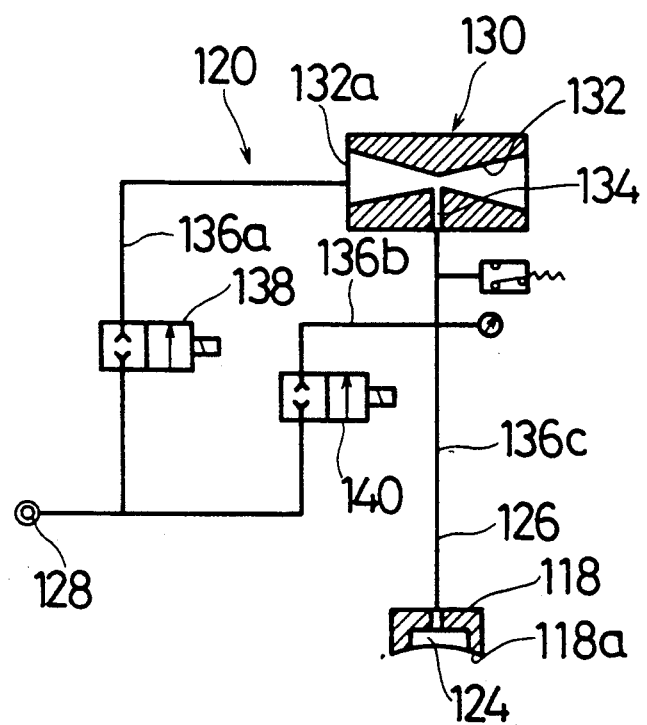
FIG. 13 is a pneumatic circuit diagram showing a pneumatic mechanism of the work transfer device.

As shown in FIG. 13, the pneumatic means is equipped with, for example, an air pump 128 acting as a pneumatic source, and a venturi type vacuum generator 130. A through air passage 132 of which the central part forms a through portion is provided inside the vacuum generator 130. An end opening of a thin pipe 134 is provided at the most restricted portion of the throat air passage 132.

The pneumatic means 120 comprises a first connecting pipe 136a connecting inlet 132a of air passage 132 of the vacuum generator 130 and air pump 128, a first electromagnetic valve 138 provided in the first connecting pipe 136a, a second connecting pipe 136b connecting the air pump 128 and the thin pipe 134, a second electromagnetic valve 140 provided in the second connecting pipe 136b, and a third connecting pipe 136c connecting a portion of the second connecting pipe 136b between the second electromagnetic valve 140 and the thin pipe 134 with the communicating hole 126.

This construction of the pneumatic means enables selective generation of injection pressure (compressed air) or suction pressure (decompressed air) in suction hole 124 of the suction pad 118, as will now be described.

When the first electromagnetic valve 138 is switched "ON" and the second electromagnetic valve 140 is switched "OFF", air injected from air pump 128 is supplied to inlet 132a of throat air passage 132 of vacuum generator 130 through the first connecting pipe 136a, and flows inside the throat air passage 132. Accordingly, negative pressure (vacuum pressure) is generated inside the thin pipe 134 which opens at the most restricted portion of the throat air passage 132. This vacuum pressure is supplied to suction hole 124 of the suction pad 118 through the third connecting pipe 136c and the communicating hole 126 inside the removal arm 114.

Due to this suction air pressure, the workpiece W in contact with the end surface 118a of the suction pad 118 is sucked against the suction pad 118. Then workpiece W is removed from the grinding position when the removal arm 114 pivots from the removal position to the transfer position when activated by the driving mechanism, which will be described later.

On the other hand, when the first electromagnetic valve 138 is switched "OFF" and the second electromagnetic valve 140 is switched "ON", air injected from air pump 128 is supplied simultaneously to the thin pipe 134 and the communication hole 126 through the second connecting pipe 136b and the third connecting pipe 136c. This means that air flows into the air passage 132 through the thin pipe 134, and, at the same time, is injected through suction hole 124.

Consequently, injection pressure acts on the end surface 118a of the suction pad 118 and is forced outwardly therefrom. This prevents coolant and grinding chips, which will be described later, from being sucked into the suction hole 124 when no workpiece W is held against the suction pad 118.

Due to this construction of the pneumatic means, immediately after the first electromagnetic valve 138 is switched from "ON" to "OFF" and the second electromagnetic valve 140 is switched from "OFF" to "ON", vacuum pressure acting on suction hole 124 becomes injection pressure. In this way, time needed to switch between pressure modes is largely reduced, thus improving productivity.

Figure 12:
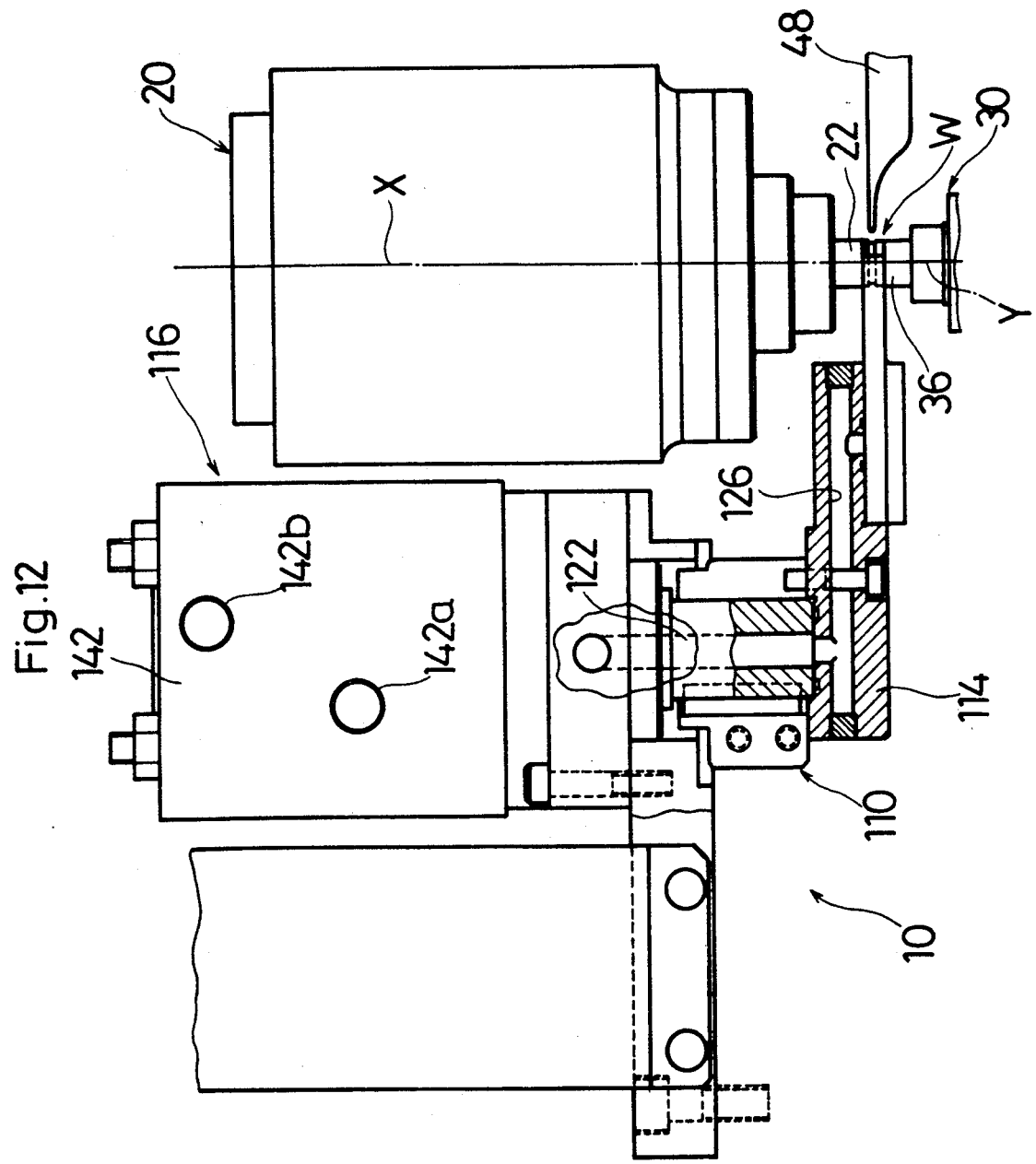
FIG. 12 is a front view of a driving mechanism of the removal mechanism shown in FIG. 11.

As shown in FIG. 12, the driving mechanism 116 comprises a rotary hydraulic piston 142 which can be rotated 90°, and a reciprocating driving shaft 122 which is retractable by 90° and is activated by the rotary piston 142. The rotary piston 142 has first and second hydraulic ports 142a, 142b. When the first hydraulic port 142a is supplied with hydraulic pressure from the hydraulic pressure source (not shown in the drawings), the driving shaft 122 rotates clockwise as shown in FIG. 11. On the other hand, when the second hydraulic port 142a is supplied with hydraulic pressure, the driving shaft 122 rotates counterclockwise as shown in FIG. 11.

The rotary piston 142 can cause the driving shaft 122 to stop at a fixed rotational angle so as to halt the removal arm 114 in a standby position (for example approximately 2 to 3 mm above the workpiece W in the grinding position). Since air is supplied from the suction hole 124 of the suction pad 118 when the removal arm 114 is in the standby position, the standby position can be set close to the removal position. As a result, the time required for the arm 114 to travel from the standby position to the removal position can be minimized and productivity can be improved.

As described below, the pneumatic means 120 is controlled in relation to the driving mechanism 116 by means of a control mechanism which is not shown in the drawings.

When driving mechanism 116 holds removal arm 114 in the standby position, pneumatic means 120 supplies air from the suction pad 118 by closing the first electromagnetic valve 138 and opening the second electromagnetic valve 140. When the grinding process is finished, the tailstock spindle 36 of the tailstock spindle driving mechanism 34 of the tailstock mechanism 30 is retracted and rotation of the workpiece W is stopped. At the same time, the driving mechanism 116 activates the rotary piston 142 to pivotally move the removal arm 114 from the standby position to the removal position. In this manner, the end surface 118a of the suction pad 118 makes contact from above with the outer periphery of the finished workpiece W.

Simultaneously with the activation of driving mechanism 116, negative pressure (suction pressure) is generated in suction hole 124 of the suction pad 118 by opening the first electromagnetic valve 138 and closing the second electromagnetic valve 140. Then the workpiece W is attracted by suction to the suction pad 118.

After attraction of the workpiece W to the suction pad 118, the driving mechanism 116 moves the removal arm 114 from the removal position to the transfer position, while negative pressure is still being created at the suction hole 124 of the suction pad 118. When the suction pad is moved to the transfer position, pneumatic means 120 closes the first electromagnetic valve 138 and opens the second electromagnetic valve. Accordingly, air is injected from suction hole 124 of the suction pad 118 to thereby release the workpiece W from the suction pad 118.

Here, a stroke of the removal arm 114 from the transfer position to the standby position (including when the arm 114 is in the standby position) is defined as a standby stroke, during which no workpiece is transferred. On the other hand, a stroke of the removal arm 114 from the removal position to the transfer position is defined as a removal stroke, during which the workpiece W is transferred.

After release of the workpiece W, driving mechanism 116b moves the removal arm 114 from the transfer position to the standby position while air is still being injected from the suction hole 124 of the suction pad 118 and the process of removing the workpiece W is complete.

The transfer mechanism 112, another element of the workpiece transfer device 10, will be described in detail with reference to FIG. 7, FIG. 14 and FIG. 15. The purpose of the transfer mechanism 112 is to transfer the workpiece W, after it has been removed from the grinding position by removal mechanism 110 and released from removal arm 114 into the transfer position, to the next process.

As shown in FIG. 7, the transfer mechanism 112 is mounted on the device body 72. The finished workpiece W, with both sides $W_B$ and $W_C$ thereof parallel to the end surface 22a of the main shaft 22 and the end surface 36a of the tailstock spindle 36 as they were when removed by the workpiece removal mechanism 110, is accepted by initial transfer opening 144, which will be described later, and is sent upward along a curved path, and then transferred horizontally.

Provided at the front side of the device body 72 is a groove defining plate 148 which defines a transfer guide groove 146 for transferring workpiece W from the initial transfer opening 144 to the position of the next process. As shown in FIGS. 7 and 15, the guide groove 146 is formed inside the groove defining plate 148. The guide groove 146 is composed of a curved groove 146a with its lower opening defining the initial transfer opening 144 and a horizontal groove 146b communicating with the upper end of the curved groove 146a at one end portion thereof. The previously-mentioned thrust mechanism 150, for transferring workpiece W after it is released from the suction pad 118 upward through the curved groove 146a, is provided in a position opposite the initial transfer opening 144 of the curved groove 146a in the groove defining plate 148. A workpiece rejection mechanism 152 for removing work transferred through the curved groove 146a when necessary is provided in a middle portion of the horizontal groove 146b.

As shown in FIG. 7, the position of the thrust mechanism 150 is such that it is opposite one side $W_B$ of the workpiece W, which, at this point, is still attracted to the suction pad 118 of the removal arm 114 at the transfer position in the groove defining plate 148. Specifically, the thrust mechanism 150 is equipped with an air injection hole 154 extending diagonally through the fixed portion of the groove defining plate 148, and a feed port 156 provided at a side surface of the groove-defining plate 148 and is connected to a compressed air source (not shown in the drawings).

Figure 14:
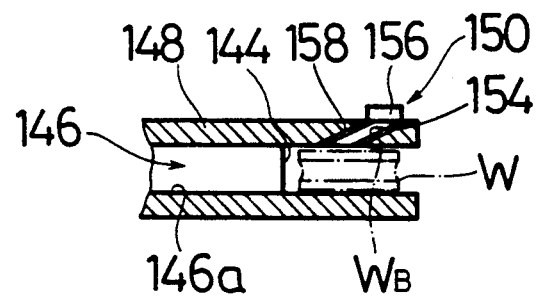
FIG. 14 is a cross sectional view showing a thrust mechanism of a workpiece transfer mechanism.

As shown in FIG. 14, the air injection hole 154 is furnished with an air injection nozzle 158 which can inject enough compressed air to thrust workpiece W upwardly after it is released from the suction pad 118 to the transfer guide groove 146 through the initial transfer opening 144. That is, the finished workpiece W is released from the suction pad 118 of the removal arm 114 at the transfer position and is thrust upwardly by the thrust mechanism 150 so it can be transferred through the transfer guide groove 146.

Figure 15:
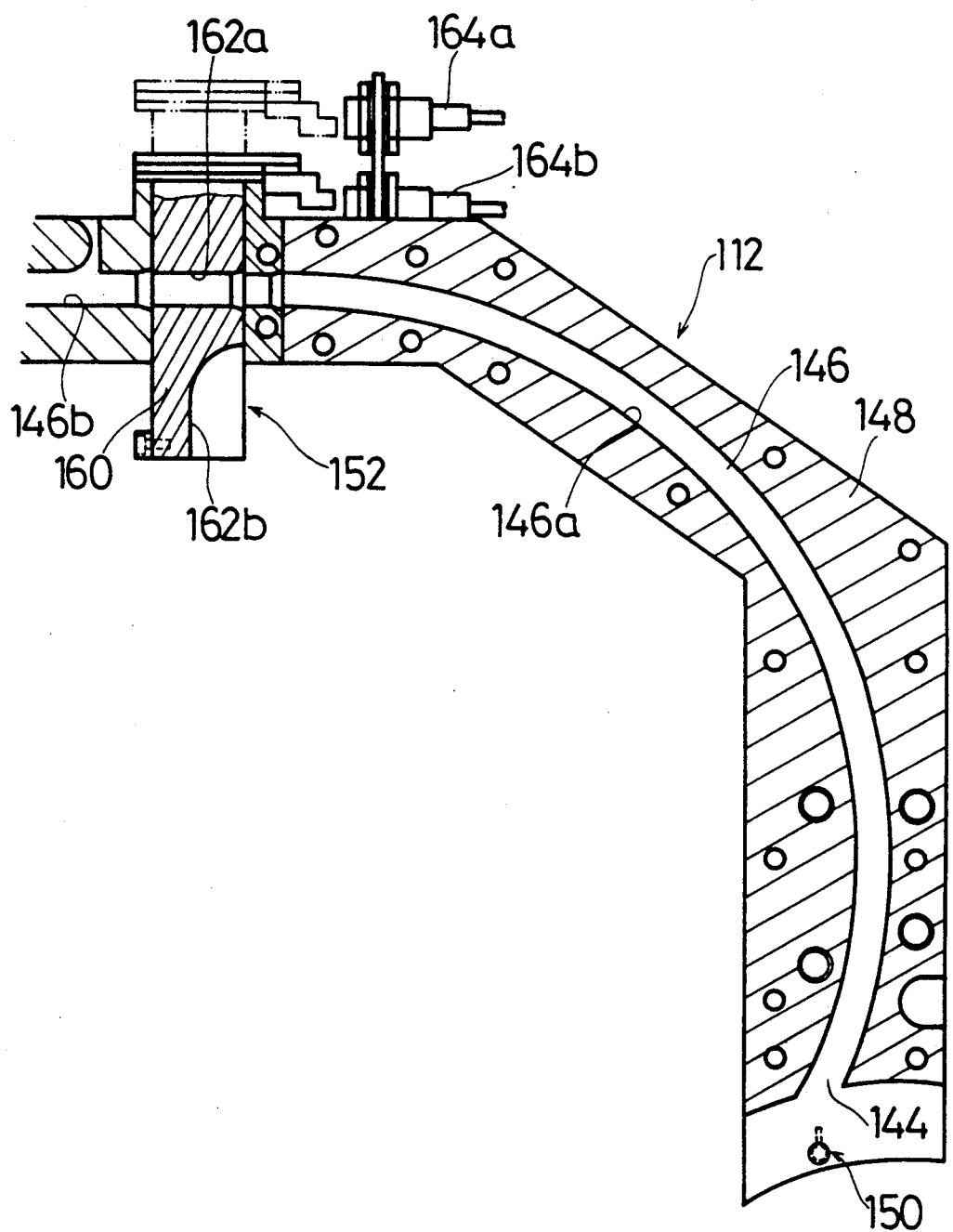
FIG. 15 is a cross sectional view showing a workpiece rejection mechanism of the work transfer mechanism.

Referring now to FIG. 15, the workpiece rejection mechanism 152 will be discussed. When the wheel 48 is used immediately after dressing, the first several workpieces W should be disposed of because the grinding surface of the wheel is still rough due to the dressing. The rejection mechanism 152 is provided to allow the first several workpieces W to be rejected prior to being transferred to the next processing position.

The rejection mechanism 152 is equipped with a switching member vertically movably mounted to the groove-defining plate 148 against the portion thereof which forms the horizontal groove 146b. The switching member 160 is equipped with a horizontally extending first groove 162a and second (branched) groove 162b, which is curved downwardly relative to the horizontal.

The horizontal first groove 162a communicates with the horizontal groove 146b of the transfer guide groove 146 when the switching member 160 is in its lower position (which is its normal position due to gravity). The curved second groove 162b communicates with an upstream end (i.e. portion of the horizontal groove 146b to the right of the switching member in FIG. 15) of horizontal groove 146b of the transfer groove 146 when the switching member 160 is moved to its upper position.

A pair of detectors 164a, 164b are mounted in positions respectively opposed to the upper and lower positions of the switching member 160 for detecting when the switching member 160 is in its upper and lower positions, respectively. The upper detector becomes "ON" when the switching member 160 is in the upper position while the lower detector 164b is "OFF". The lower detector 164b becomes "ON" when switching member 160 is in the lower position while the upper detector 164a is "OFF". With these detectors 164a, 164b, the position of the switching member 160 can be reliably detected.

When there are workpieces to be rejected in the workpiece rejection mechanism 152, the switching member 160 is raised to the upper position to communicate the second groove 162b with horizontal groove 146b. Then, when the workpiece W is carried upward through the curved groove 146a by the thrust mechanism 150 along the curved second groove 162b and is disposed of downwardly from the horizontal groove 146b in the workpiece rejection mechanism 152.

When there is no workpiece to be disposed of by the workpiece rejection mechanism 152, the switching member 160 is moved down to the lower position to place the first groove 162a in communication with the horizontal groove 146b. Then, when the workpiece W is carried upward through the curved groove 146a, it passes through the first groove 162a of the switching member 160 and through the horizontal groove 146b to the next processing step.

The entire machining process of the grinding machine 12 will now be described according to the order in which it is performed.

As shown in FIG. 7, the workpiece W to be processed is sent from the inlet opening 74 into the first vertical groove 76a where workpieces are piled up. The workpiece W to be processed next is positioned inside the hole 80a formed at the end of transfer rod 80. The workpiece W is transferred by movement of rod 80 to the second vertical groove 76c where it is caught by the catching leaf spring 84 in the catching position above the grinding position. The workpiece W is then pressed downwardly by the leaf spring 84 until it reaches the grinding position where it is supported by both shoes 96, 98. During the machining process, the removal arm 114 is maintained in the standby position as shown in FIG. 7. At this time, the suction pad 118 attached to the end of the removal arm 114 has air being forced through the suction hole 124 by pneumatic means 120.

When the machining of the workpiece W is finished, the wheel driving mechanism 46 withdraws the wheel 48 from the grinding position in which it grinds the workpiece W. At the same time, the removal mechanism 110 starts removing the processed workpiece W by way of workpiece transfer device 10. More specifically, the tailstock spindle driving mechanism 34 stops rotation and retracts the tailstock spindle 36 to release the workpiece W while coolant feed device 10 halts supply of coolant from the coolant feed pipes 106, 108a and 108b.

At this time, pneumatic means 120 is switched from its air injection mode to its air suction mode. As shown in FIG. 6, the removal arm 114 is pivoted from the standby position (shown in solid lines) to the removal position (shown in FIG. 11) by operation of the driving mechanism 116 such that the end surface 118a of the suction pad 118 contacts the outer periphery of the workpieces W. Then, due to suction through hole 124 of the suction pad 118, the workpiece W is attracted to the suction pad 118.

The driving mechanism 116 next rotates the removal arm 114 by 90° from the removal position to the transfer position. Consequently, the finished workpiece is transferred to the initial transfer opening 144. When this is transfer occurs, pneumatic means 120 is switched again to its air injection mode. As a result, the finished workpiece W is released from the suction pad 118 and thrust into the initial transfer opening 144 and through the transfer guide groove 146 by the thrust mechanism 150. At this time, the removal arm 114 has reached the end of a removal stoke.

After releasing the finished workpiece W, the removal mechanism 110 is activated to pivot the removal arm 114 through its standby stroke to the standby position.

As mentioned previously and as shown in FIG. 8B, the push rod of the push mechanism 86 is lowered from its upper position to its press position so as to press down the workpiece W which has been stopped at the catching position by the leaf spring 84. When the workpiece W is pressed down by the rod 94 it falls onto the pair of shoes 96, 98 and is supported therebetween. The pressing-down rod 94 is then brought back to the upper position.

When the workpiece is set in the grinding position, the tailstock spindle 36 of the tailstock spindle driving mechanism 34 is extended to hold the workpiece W between the tailstock spindle 36 and the main shaft 22. This allows the workpiece W to be rotated by the main shaft 22. As rotation is commenced, the coolant feed device 100 begins releasing coolant and the wheel 48 is moved along the second axis B to make contact with the workpiece W in the grinding position and to carry out the grinding operation.

After the push rod 94 is moved to its upper position, as shown in FIG. 8A, the transfer rod 80 is moved from its withdrawing position to its projecting position to transfer the workpiece W, held inside the hole 80a at the end of transfer rod 80, to the upper end of the second vertical grove 76c. Then, due to gravity, the workpiece W falls through the second vertical groove 76c and is caught by catching leaf spring 84.

The transfer rod 80 then immediately returns to its withdrawing position due to gravity. The next workpiece W to be processed falls into the hole 80a at the end of transfer rod 80.

The above description is illustrative of the sequence by which the workpiece W is processed.

As described above, in this work transfer device 10, when the removal arm 114 is in the standby position, the suction pad 118 is injecting air from the suction hole 124 thereof. Accordingly, even when the standby position is set close to the removal position, no coolant or grinding chips are sucked into the device through suction hole 124. This allows a proper suction pressure to be maintained.

On the other hand, when removing the workpiece W, the pneumatic means 120 is switched so as to create a negative pressure (suction pressure) at the suction hole 124 of the suction pad 118. The finished workpiece W is then attracted to the suction pad 118. During removal of the workpiece W, since both the rotation of the workpiece W and release of coolant are stopped, generation of the negative pressure of the suction pad 118 will never cause intrusion of coolant and grinding chips into the suction hole 124.

The workpiece W is attracted to the suction pad 118, and transferred by movement of the removal arm 114 and released at the transfer position when pneumatic means 120 is switched from its negative pressure supply mode to its air injection mode. The workpiece W is then thrust upwardly and transferred through the transfer guide groove 146 by the mechanism 150, which diagonally injects air under pressure through the injection hole 154.

Various changes and modifications are possible in the present invention.

For example, workpieces which can be processed in the device of the present invention are not limited to the inner race of a radial bearing. Workpieces of any shape can be processed as long as they can be processed by a grinding operation.

The above-mentioned embodiment uses a rotary piston 142 capable of moving between three positions so that the removal arm 114 can be positioned in the standby position, as well as the removal and the transfer positions. However, a conventional rotary piston having only two positions can also be used. In this case, the removal and the standby position will be the same position, but the removal (standby) position of the removal arm 114 must be such that the end surface 118a of the suction pad 118 is set 0.1 and 0.9 mm above the workpiece W in the grinding position. Air should be injected when the removal arm 114 is in the removal (standby) position. When the pneumatic mechanism 120 is switched to its negative pressure supply mode, although the standby position and the removal position are the same, the workpiece W in the grinding position can be attracted by the suction pad because the above spacing is sufficiently small. In this way, use of the two-position rotary piston results in a shorter processing time because it is unnecessary to move the removal arm 114 between the standby and the removal positions.

In the present embodiment, the switching member 160 of the rejection mechanism 152 is manually operated for movement in the vertical direction. However, the switching member 160 can be automatically operated to move in the vertical direction by connecting it to a hydraulic cylinder mechanism.

We claim:

1. A workpiece transfer device for a grinding machine for transferring a workpiece between positions, comprising:
    means for rotating the workpiece during grinding thereof;
    shoe means for supporting the workpiece in a grinding position by contacting an outer periphery of the workpiece;
    removal arm means for moving the workpiece between a grinding position in which the workpiece is subject to a grinding operation and a transfer position in which the workpiece is subject to transfer to a subsequent operation;
    driving means for driving said removal arm means between said grinding position, said transfer position and a standby position in which said removal arm is positioned near said grinding position but spaced therefrom;
    a suction pad mounted to an end of said removal arm means and adapted to hold the workpiece; and
    pneumatic means for injecting air outwardly from said suction pad when said removal arm means is in said standby position and during movement of said removal arm means from said transfer position to said standby position and for creating suction at said suction pad during movement of said removal arm means from said removal position to said transfer position.

2. A workpiece transfer device as recited in claim 1, wherein
    said pneumatic means is also operable to inject air outwardly from said suction pad when said removal arm means is in said transfer position.

3. A workpiece transfer device as recited in claim 2, wherein
    said pneumatic means is also operable to create suction at said suction pad during movement of said removal arm means from said standby position to said removal position.

4. A workpiece transfer device as recited in claim 1, wherein
    said suction pad has an end surface with a suction hole formed therethrough, said suction hole being pneumatically connected to said pneumatic means.

5. A workpiece transfer device as recited in claim 4, wherein
    said end surface of said suction pad is contoured to fit complementarily against the outer periphery of the workpiece.

6. A workpiece transfer device as recited in claim 5, wherein
said end surface is curved in a circular arc.

7. A workpiece transfer device as recited in claim 1, wherein
said suction pad is detachably mounted to said removal arm means.

8. A workpiece transfer device as recited in claim 1, wherein
said pneumatic means comprises means for generating pressurized air and vacuum generating means for receiving said pressurized air so as to create a vacuum.

9. A workpiece transfer device as recited in claim 8, wherein
said vacuum generating means comprises a venturi tube connected to said pressurized air generating means such that said pressurized air flows through said venturi tube, said venturi tube having a narrow pipe opening thereinto at a narrowed throat portion thereof, said narrow pipe being pneumatically connected to said suction pad.

10. A workpiece transfer device as recited in claim 1, further comprising
coolant feed means for feeding coolant to the workpiece when the workpiece is in the grinding position except when said pneumatic means is creating suction at said suction pad.

11. A workpiece transfer device as recited in claim 10, wherein
said coolant feed means comprises three coolant feed pipes opening at three different locations about the periphery of the workpiece when the workpiece is in the grinding position.

12. A workpiece transfer device as recited in claim 1, wherein
said driving means comprises a rotary hydraulic position.

13. A workpiece transfer device as recited in claim 1, wherein
said driving means is operable to maintain said removal arm means in said standby position during grinding of the workpiece.

14. A workpiece transfer device as recited in claim 1, further comprising
transfer means for transferring the workpiece from said transfer position to the subsequent operation.

15. A workpiece transfer device as recited in claim 14, wherein
said transfer means comprises a groove-defining plate having a transfer guide groove formed therein, and an air injection hole opening into said transfer guide groove, said air injection hole extending at an angle relative to said transfer guide groove.

16. A workpiece transfer device as recited in claim 15, further comprising
thrust means for thrusting the workpiece from said transfer position into said transfer guide groove.

17. A workpiece transfer device as recited in claim 16, wherein
said transfer means comprises a groove-defining plate having a transfer guide groove formed therein; and
a workpiece rejection means, comprising a switching member mounted between upstream and downstream portions of said transfer guide groove and being selectively movable between a first position in which it causes said upstream portion of said transfer guide groove to communicate with said downstream portion of said transfer guide groove and a second position in which said switching member causes said upstream portion of said guide groove to communicate to outside of said transfer guide groove, is provided for rejecting the workpiece when said switching member is in said second position and transferring the workpiece to said subsequent operation when said switching member is in said first position.

18. A workpiece transfer device as recited in claim 1, wherein
said workpiece rotating means comprises a main shaft and a tailstock spindle between which the workpiece is adapted to be held.

19. A workpiece transfer device as recited in claim 18, further comprising
means for rotatably driving said main shaft.

20. A workpiece transfer device as recited in claim 18, wherein
said workpiece rotating means is operable to hold a plurality of workpieces.

21. A workpiece transfer device for a grinding machine for transferring a workpiece between positions, comprising:
a main body shaft and a tailstock spindle for holding the workpiece therebetween and for rotating the workpiece;
shoe means for supporting the workpiece in a grinding position by contacting an outer periphery of the workpiece;
removal arm means for moving the workpiece between a grinding position in which the workpiece is subject to a grinding operation and a transfer position in which the workpiece is subject to transfer to a subsequent operation;
driving means for driving said removal arm means between said grinding position, said transfer position and a standby position in which said removal arm is positioned near said grinding position but spaced therefrom;
a suction pad mounted to an end of said removal arm means and adapted to hold the workpiece;
pneumatic means for injecting air outwardly from said suction pad during movement of said removal arm means from said transfer position to said standby position and for creating suction at said suction pad during movement of said removal arm means from said removal position to said transfer position;
transfer means for transferring the workpiece from said transfer position to the subsequent operation, said transfer means comprising a groove-defining plate having a transfer guide groove formed therein; and
a workpiece rejection means, comprising a switching member mounted between upstream and downstream portions of said transfer guide groove and being selectively movable between a first position in which it causes said upstream portion of said transfer guide groove to communicate with said downstream portion of said transfer guide groove and a second position in which said switching member causes said upstream portion of said guide groove to communicate to outside of said transfer guide groove, for rejecting the workpiece when said switching member is in said second position and transferring the workpiece to said subsequent operation when said switching member is in said first position.

* * * * *